US006587888B1

(12) United States Patent
Chieu et al.

(10) Patent No.: US 6,587,888 B1
(45) Date of Patent: Jul. 1, 2003

(54) DYNAMIC SOFTWARE WRAPPER

(75) Inventors: David Pai-wei Chieu, Culver City, CA (US); Dennis Hollingworth, Redondo Beach, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 0 days.

(21) Appl. No.: 09/464,375

(22) Filed: Dec. 15, 1999

(51) Int. Cl.[7] .................................................. G06F 9/46
(52) U.S. Cl. ....................................................... 709/313
(58) Field of Search ................................ 709/316, 310, 709/313

(56) References Cited

U.S. PATENT DOCUMENTS

| | | | | |
|---|---|---|---|---|
| 6,014,666 A | * | 1/2000 | Helland et al. | 707/9 |
| 6,026,238 A | * | 2/2000 | Bond et al. | 709/328 |
| 6,141,696 A | * | 10/2000 | Goertzel et al. | 709/310 |
| 6,263,491 B1 | * | 7/2001 | Hunt | 717/130 |

OTHER PUBLICATIONS

Matt Pietrek, "Learn System–Level Win32 Coding Techniques by Writing an API Spy Program," Dec. 1994, Microsoft Systems Journal, Volumn. 9.*

Jacob R. Lorch and Alan Jay Smith, "The VTrace Tool: Building a System Tracer for Windows NT and Windows 2000", Oct. 2000, MSDN Magazine, vol. 15 No. 10.*

Balzer, et al., Mediating Connectors.

Brown, Building a Lightweight COM Interception Framework Part I: The Universal Delegator, Microsoft Systems Journal, Jan. 1999, 17 pgs., vol. 14 http://www.microsoft.com/msj/defaultframe.asp?page=/msj/0199/intercept/intercept.htm.

Brown, Building a Lightweight COM Interception Framework Part II: The Guts of the UD, Microsoft System Journal, Feb. 1999, 15 pgs., vol. 14 http:www.microsoft.com/msj/defaultframe.asp?page=/msj/0299/intercept2.intercept2.htm.

Fraser, et al., Hardening COTS Software with Generic Software Wrappers, Proceedings of the 1999 IEEE Symposium on Security and Privacy, The Institute of Electrical and Electronics Engineers, Inc., 1999.

Hunt, et al., Intercepting and Instrumenting COM Applications, Proceedings of the 5th Conference on Object–Oriented Technologies and Systems (COOTS'99), May 1999, 12 pgs., San Diego, CA, http:www.research.microsoft.com/research/os/galenh/Publications/huntCoots99.pdf.

Pietrek, Learn System–Level Win32 Coding Techniques by Writing an API Spy Program, Microsoft Systems Journal 19, Dec. 1994, vol. 9, No. 12.

* cited by examiner

Primary Examiner—Alvin Oberley
Assistant Examiner—Li Zhen
(74) Attorney, Agent, or Firm—Silicon Valley IP Group; Kevin J. Zilka; Christopher J. Hamaty

(57) ABSTRACT

The present invention is directed at the implementation of a dynamic wrapper for discovery of non-exported functions and subsequent method interception. A practical usage of dynamic wrappers is for security software packages to augment access controls applied to the wrapped modules. The invention permits interception of distributed component object model (DCOM) client initiated method calls at a DCOM server during runtime. The interceptor of the method call denies or grants access to the DCOM method to be executed. The actual logic to determine access permissions need not be part of the interceptor. The interceptor runs as part of the DCOM server. It contains logic to distinguish at runtime the identity of the principal associated with the DCOM client requesting the execution of the function call. The technique works with commercial-off-the-shelf (COTS) software and does not require modification of the application source code.

21 Claims, 5 Drawing Sheets

DYNAMIC SOFTWARE WRAPPER

GOVERNMENT LICENSE RIGHTS

This invention was made with Government support under contract #F30602-97-C-0269 awarded by USAF, AFMC, Air Force Research Laboratory/IFKRF. The Government has certain rights in the invention.

BACKGROUND OF THE INVENTION

1. Field of the Invention

The present invention is directed at the implementation of a dynamic wrapper for discovery of non-exported functions and subsequent method interception.

2. Description of the Prior Art and Related Information

The distributed component object model (DCOM) is a model providing access to distributed objects, usually on a network. DCOM defines the object interfaces. DCOM defines a remote procedure call protocol that allows objects to be run remotely over a network. DCOM was introduced in the operating system WINDOWS NT 4.0 by the Microsoft Corporation of Redmond Wash.

A service control manager (SCM) is a part of WINDOWS NT that launches background tasks. Developers can write executable programs that run under the control of the SCM. DCOM functions can similarly be written to run under the control of the SCM. Part of defining the functions to do so comprises having the function "register" itself with the SCM.

In object technology, including DCOM object technology, software applications include objects, which include methods or functions, which are called functions herein. Objects are the software building blocks of object technology. A function defines the processing that an object performs. DCOM clients access functions through the protocol defined within DCOM.

A software wrapper is a piece of code that is inserted into a target function at execution time. The execution behavior of the function is altered intentionally by the inserted wrapper code. Heretofore, since the wrapper does not have knowledge of the target function's source code a priori, the wrapper can only access a target function's publicly defined entry points. These entry points are normally established statically by the compiler and referred to as exported functions. The compiler generated program module contains embedded symbol information for exported functions that can be used by the wrapper at runtime. In contrast, non-exported functions have no compiler produced symbol information stored in the program module.

A DCOM system may be implemented on a DCOM server, which allows client computers to access exported functions having the publicly defined entry points on the DCOM server. Current software wrapper technology for DCOM software application programs revolves around interception of exported functions. Such systems are described in Matt Pietrek, "Learn System-Level Win 32 Coding Techniques by Writing an API Spy Program", Microsoft Systems Journal, Vol 9 No Dec. 12, 1994, pp 17–44; Timothy Fraser, Lee Badger, and Mark Feldman, "Hardening COTS Software with Generic Software Wrappers", Proceedings of the 1999 IEEE Symposium on Security and Privacy, Oakland Calif., May 1999; and Robert Balzer and Neil Goldman, "Mediating Connectors", Proceedings the 19th IEEE International Conference on Distributed Computing Systems Workshop, Austin, Tex. May 31–Jun. 5, 1999. In order for the wrapper code to intercept functions in given software module, a set of exported functions has to be explicitly declared at compile time. This approach works well with interception at kernel level application programming interfaces (API) which are the interfaces between applications and operating systems.

However, application software development has progressed toward a more object-oriented model where packaged modules have few explicitly exported functions. Conventional wrapper technology is unsuitable for such environments because of the lack of compiled symbol information.

There exist the need for a wrapping, or intercepting, technique that dynamically discovers non-exported functions for subsequent interception. The system and method of the present invention is referred to as a system of dynamic wrappers because the system does not rely on compiled symbol information. In one embodiment, the system of the present invention is used intercept functions of computer programs written as Microsoft DCOM executables.

SUMMARY OF THE INVENTION

The present invention defines a technology for dynamic wrappers for non-exported functions, allowing interception of non-exported functions in application software modules or functions. In order for a dynamic wrapper to understand and intercept software modules that have non-exported functions, the wrapper preferably should have intrinsic knowledge of the underlying protocol used by the intercepted modules. Therefore, one embodiment of the present invention is coupled with the Microsoft DCOM protocol and Windows NT operating system. Such a system may run on Microsoft Windows NT for the Intel x86 platform. However, DCOM interception may also run on other windowed operating systems and UNIX machines as well.

The design permits interception of DCOM client initiated method calls at the DCOM server during runtime. The interceptor of the method call denies or grants access to the DCOM method to be executed. The actual logic to determine access permissions need not be part of the interceptor. The interceptor runs as part of the DCOM server. It contains logic to distinguish at runtime the identity of the principal associated with the DCOM client requesting the execution of the function call. The technique works with commercial-off-the-shelf (COTS) software and does not require modification of the application source code.

DETAILED DESCRIPTION OF THE PREFERRED EMBODIMENTS

One embodiment of the present invention functions with the Microsoft DCOM protocol, Windows NT operating system, and the following programming languages: assembly and C/C++. DCOM interception consists of four major steps. Step one involves interception of a Microsoft-defined exported DCOM function to obtain runtime DCOM class identifiers. Step two involves locating DCOM objects by searching through the Windows registry. Step three involves construction of interception code for each DCOM function to be intercepted. Step four involves enforcement of the access control policy by granting or denying access to the DCOM method. The first three steps are performed during initialization of a DCOM server. The last step is executed every time a DCOM client invokes a targeted DCOM server method.

DCOM interception, via this approach, introduces minimal runtime latency, because most work associated with interception is performed before any runtime DCOM methods are executed, although there may be some runtime latency on the first invocation of a method if the server is not already running due to the initialization of the interceptor.

Figure 1:
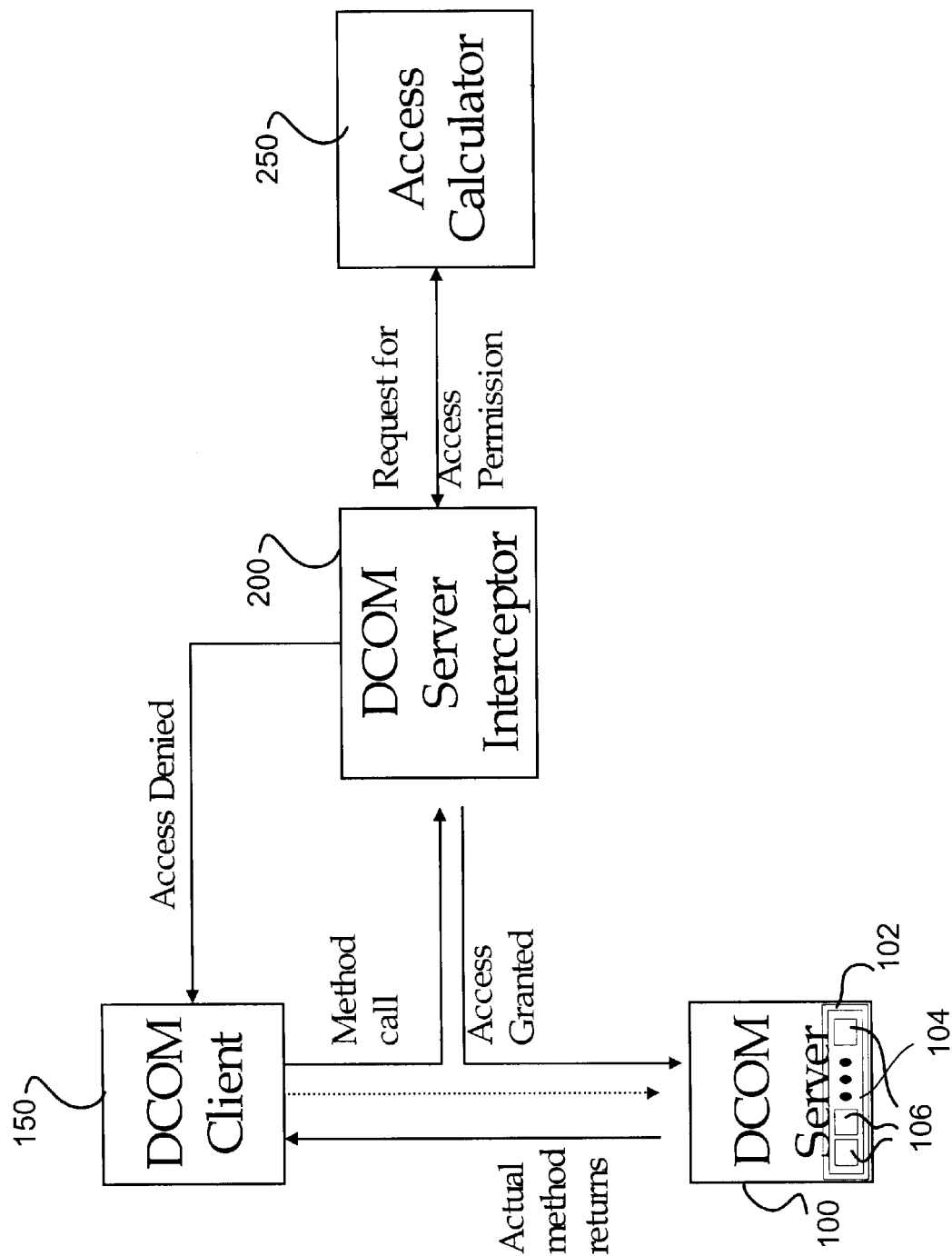
FIG. 1, is a block diagram illustrating an overview of the software modules of the present invention.

With reference to FIG. 1, an overview of the software modules of the present invention is shown. The system includes a distributed component object model (DCOM) server 100, for executing DCOM compliant software applications, also called computer programs 102, having objects 104, the objects 104 having methods which are also called functions 106, each object 104 being a member of a class (108 in FIG. 2 described below). The DCOM client 150 is used to access, or call, the functions 104 on the DCOM server 100. The functions 106 may be exported or non-exported.

A DCOM server interceptor program 200 intercepts the function calls produced by client 150, even if the called functions 106 are non-exported. The interceptor program 200 uses an access calculator 250 for calculating whether access should be granted to the client 150 for the particular called function 106.

Figure 2:
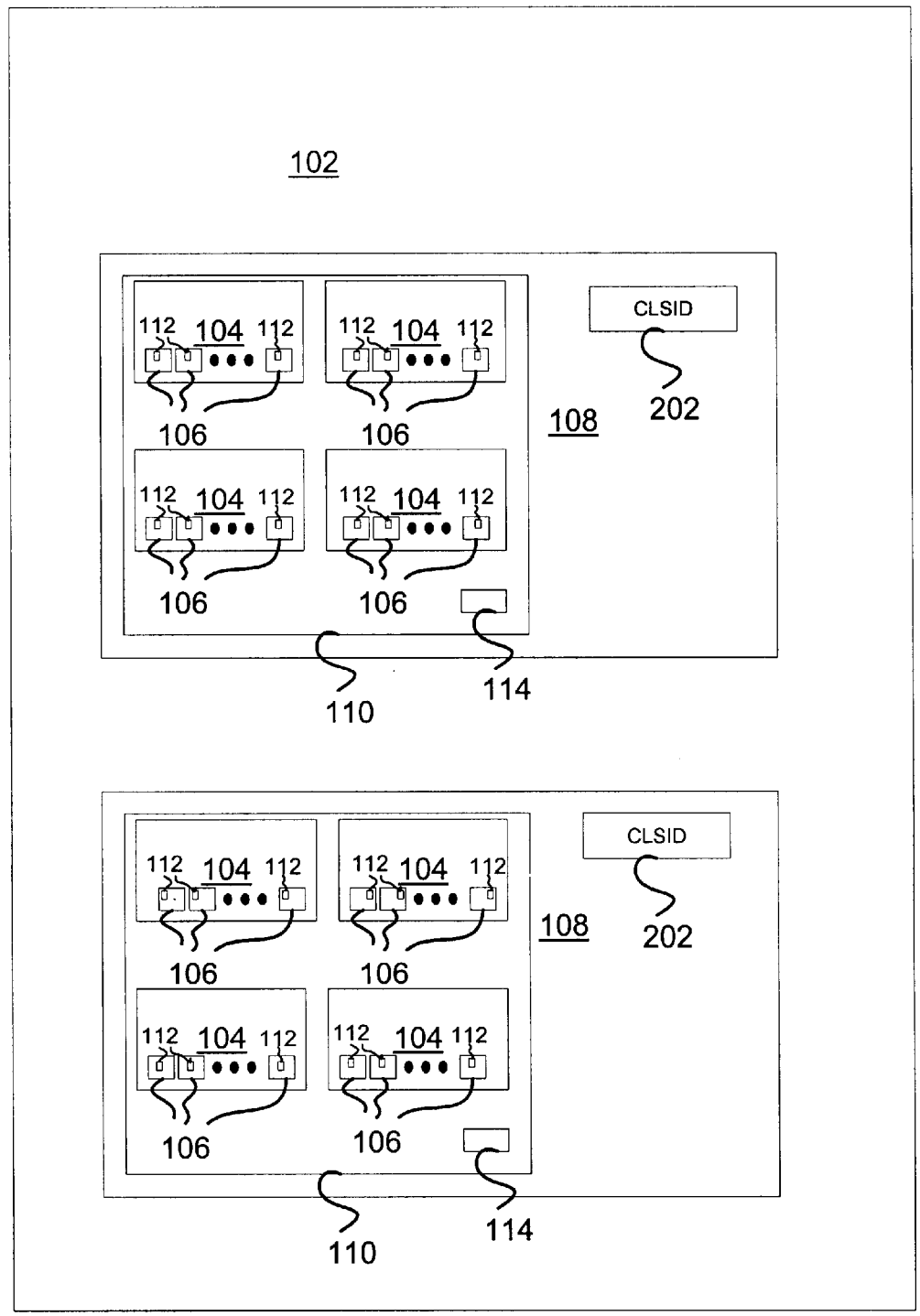
FIG. 2, is a block diagram illustrating an exemplary DCOM object-class program structure for use with the system of FIG. 1.

With reference to FIG. 2, a block diagram illustrating an exemplary DCOM run-time object-class program structure for use with the system of the present invention is shown. In object-oriented programming (OOP), a program 102 is created using modular programming techniques with rules that allow pieces of software to be reused and interchanged between different programs 102. Major concepts with respect to OOP are (1) encapsulation, (2) inheritance, and (3) polymorphism. Encapsulation is the creation of self-sufficient modules that contain data and processing (data structure and functions 106 that manipulate data). These user-defined, or abstract, data types are called classes, shown at 106. Classes 108 are created in hierarchies, and inheritance allows the knowledge in one class 108 to be passed down the hierarchy. Object-oriented programming allows functions 102 in objects 104 to be created. An object's 104 exact type is not known until it is instanced at runtime. The fact that objects 104 may embody different types at run-time is known as polymorphism.

In the DCOM server 100, each of the functions 106 are identified by a unique combination of three identifiers: the function's 106 class identifier 202 (CLSID) which identifies the class which the function 106 is a member of, an interface identifier (IID) 114, which identifies an interface 110 which the function 106 is a member of, and a method identifier (MID) 112 which is assigned to the function 106. In the DCOM server 100, the DCOM class 102 is composed of one or more interfaces 110 which are identified by IIDs 114. An interface 110 is composed of one or more functions 106. Hence, there may be hundreds of functions 106 in a class 108. Interfaces 110 group similar functions 106 together. A DCOM object 104 is created at run time when a CLSID 202 and IID 114 are provided to the DCOM kernel.

Figure 3:
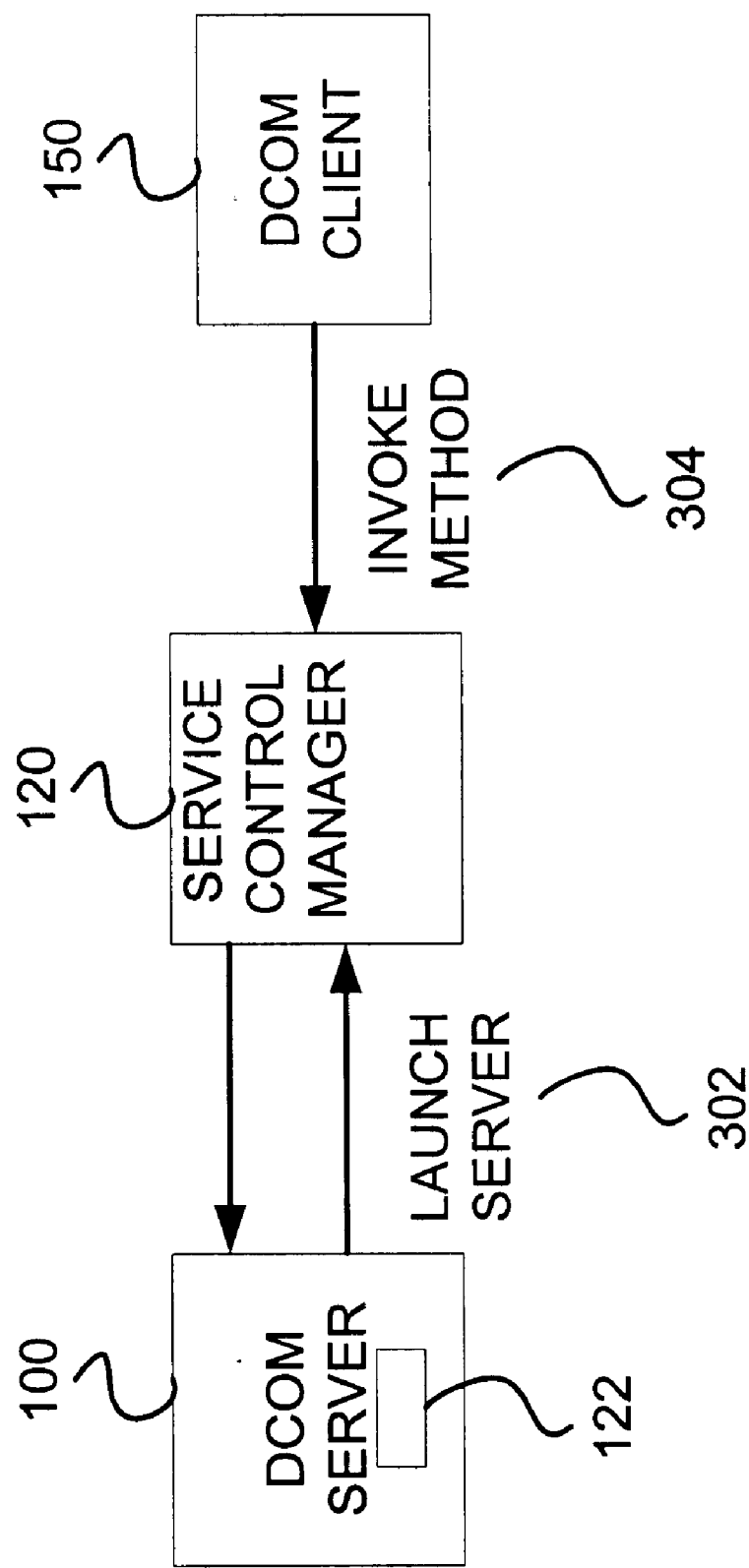
FIG. 3 is a block diagram illustrating the relationship between three of the major components of the system of FIG. 1.

With reference to FIG. 3, one preferred embodiment of the present invention operates within the WINDOWS NT operating system (NT OS) by the Microsoft Corporation of Redmond, Wash. The NT OS comprises a service control manager (SCM) 120. The SCM 120 is the part of NT that launches background tasks such as computer programs 102, causing the execution of functions 106. DCOM compliant computer programs 102 (FIG. 1) may be executed under the control of the SCM 120. The DCOM client 150 calls an object in the DCOM server 100 called CoRegisterClassObject( ) 122 for communicating data to the SCM 120.

When the DCOM server 100 is launched, as shown at 302, or initialized, as shown at 304, the DCOM server 100 initializes itself by registering its functions with the SCM 120. There are two ways that a DCOM server 100 can be launched. The SCM 120 automatically launches the DCOM server 100, or the administrator may manually launch the DCOM server 100. In both cases, the interceptor 200 (FIG. 1) dynamically attaches itself to the DCOM server 100. Support for dynamically attaching a running exported program is typically provided by the operating system via a registry such as the WINDOWS registry key. For example, the registry key for NT is named:

HKEY_LOCAL_MACHINE\ Software\ Microsoft\ WindowsNT\ CurrentVersion\ Windows\ APPIN IT_DLLS.

Part of the interceptor 200 comprises interceptor code for diverting processing to the access calculator 250. The following is an exemplary structure for the interceptor code 200 written in the "C" programming language for an INTEL x86 processor:

```
#pragma pack(1)'
typedef struct
{
    BYTE instr_push_eax1;           // [11] 0 x 50 push eax
    BYTE instr_mov;                 // [12] 0 x B8 mov eax, imm32
                                    // Insert 4 bytes of addr pointer of this structure
    DWORD                           index_dcom_func_struct;
    BYTE instr_push_eax2;           // [13] 0 x 50 push eax
    BYTE instr_call;                // [14] 0 x E8 call
                                    // Insert 4 bytes CheckAccessControl( ) relative addr.
    DWORD                           offset_CheckAccessControl;
    BYTE instr_test;                // [15] 0 x 85 test eax,eax
    BYTE instr_test_eax;            // [16] 0 x C0
    BYTE instr_jz;                  // [17] 0 x 74 jz
```

-continued

```
    BYTE    offset_jz;                          // [18] 0 x 06
    BYTE    instr_pop_eax1;                     // [19] 0 x 58 pop eax
    BYTE    instr_jmp_real_method;              // [20] 0 x E9 jmp
                                // Insert 4 bytes real DCOM method call relative addr.
    DWORD           offset_real_method;
    BYTE    instr_pop_eax2;                     // [21] 0 x 58 pop eax
    BYTE    instr_jmp_deny_access_method;       // [22] E9 jmp
                                // Insert 4 bytes access deny method relative addr.
    DWORD               addr_deny_access_method;
    DWORD               data_dcom_method;   // [23] dcom method index
    IID             data_CLSID;             // [24] CLSID
    IID             data_IID;               // [25] IID
} DCOMInterceptor, *PDCOMInterceptor;
#pragma pack ( )
```

Starting at line 11, the first PUSH instruction saves the contents of the extended accumulator A, called EAX register. At line 12, the following MOV instruction saves the beginning address of this "C" structure, index_dcom_func_struct, to the EAX register. At line 13, the code pushes the i_EAX register onto the stack. The address on the top of the stack will be used as a parameter for calling the access calculator 250. At line 14, an access decision is requested from the access calculator 250. At lines 15–16, after the access decision is made by the access calculator 250, the return value is stored in EAX and a test of the EAX is performed. At line 17, the assembly instruction JZ determines the proper branch condition. At line 18 the offset is specified for the jump instruction in line 17. If the condition is zero, then 6 bytes are jumped over by the program counter (to line 21), otherwise, the next instruction (at line 19) is executed. At line 19, since this is a standard "C" call, _stdcall, the callee cleans the stack by popping the EAX register. The code pops the stack to remove the function parameter that was passed to the access calculator 250. At line 20, if access is granted, control is passed to the targeted DCOM function 106. At line 21, this is where line 17 branched off when the condition zero is not met. As with line 19, the callee cleans the stack by popping the EAX register. At line 22, if the access is denied, control is passed to the interceptor's own access denied function, which returns an E_ACCESSDENIED flag. This flag is a Windows (Win32) flag that specifies an access denied error. Since a JMP instruction was used to pass control to the targeted function 106, control will not be returned to the interceptor. The program counter is restored to that of the caller of the intercepted DCOM function 106. Lines 23–25 store the identification data CLSID 202, IID 114, and MID 112 which are used by the access calculator 250 for identifying the function 106 that the client 150 is trying to access.

Figure 4:
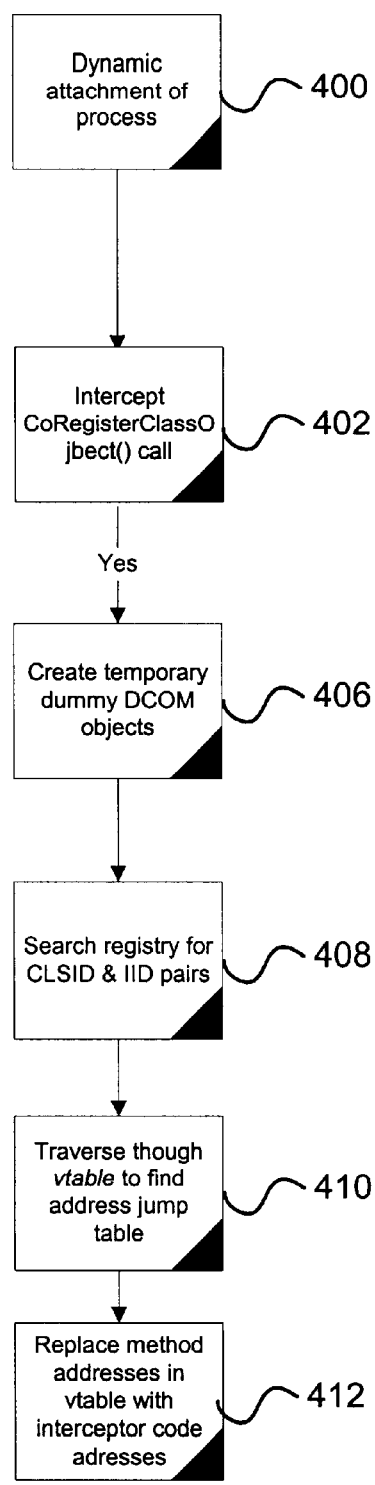
FIG. 4, is a flow diagram illustrating the steps for initializing the interceptor code segments for functions intercepted with the present invention.

With reference to FIG. 4, a flow diagram illustrating the steps for initializing the interceptor code segments for the functions 106 is shown. The first step comprises a dynamic attachment process, step 400. During server initialization, the function, CoRegisterClassObject( ) 122, is called once for every class 108 within the DCOM server 100. CoRegisterClassObject( ) 122 is a kernel function that is used to register classes 108 defined in the DCOM server 100 with the SCM 120 so that functions 106 defined in the objects 104 can be invoked by client function calls, shown at 304 in FIGS. 1 and 3. In NT, specifically, the CoRegisterClassObject( ) 122 kernel function is an exported function from the Microsoft OLE32.DLL module known by those skilled in the art of Windows programming.

Multiple CoRegisterClassObject( ) 122 function calls are intercepted as the DCOM server 100 initializes., step 402: CoRegisteredClassObject( ) 122 is an exported function for which a conventional interception technique is applied. The first parameter of the function is the class identification value, or class ID (CLSID) 202 (FIG. 2) for identifying the object class of each function. The Microsoft documentation for CoRegisterClassObject( ) 122 is as follows:

STDAPI CoRegisterClassObject(
    REFCLSID, //Class identifier (CLSID) to be registered
    IUnknown*, //Pointer to the class object
    DWORD, //Context for running executable code
    DWORD, //How to connect to the class object
    LPDWORD //Pointer to the value returned
);

The CLSID 202 is intercepted and retained by the interceptor 200 for future use. Standard techniques for interception of exported functions can be used to intercept CoRegisterClassObject( ) 122. Such interception techniques are known by those skilled in the art. For example, one such technique is described in the article by Matt Pietrek, "Learn System-Level Win32 Coding Technique by Writing an API Spy Program" Microsoft Systems Journal Vol 9 No Dec. 12, 1994 issue, pp 17–44. The CoRegisterClassOjbect( ) 122 function is intercepted to obtain runtime class identifiers 202 for each class 108 in which the non-exported functions 104 are defined.

Once a CLSID 6202 is obtained from the CoRegisterClassObject( ) object 122 for each function 106, the next step is to determine each function's 106 associated interface identifier (IID) 114. Since the DCOM server 100 does not provide a standard way to derive IIDs 114 from a given CLSID 202, one technique for determining all of the IIDs 114 for a class 108 is to search through the Windows registry. Before parsing the registry, the interceptor code creates a dummy DCOM object using the CLSID 202 via the standard CoCreateInstance( ) method defined for each IID 114, step 406. For example, the system may create an object called_IUnknown interface. This dummy DCOM object is a temporary object that is de-allocated after the interceptor 200 has been initialized. The published Microsoft DCOM protocol specification requires that all DCOM objects support the IID_IUnknown interface standard.

CoCreateInstance( ) returns a handle (i.e. pointer) that is subsequently used to locate the DCOM object 104, step 408. The interceptor code 200 then searches the Windows registry to find CLSID 20 and IID 114 pairs. The interceptor 200 scans the Windows registry using the HKEY_CLASSES_ROOT\ Interface sub-key to obtain all the known IIDs 114 in the system for corresponding CLSID 202. The Windows registry format is much like files and directories in an operating system's file system. The sub-keys are similar to directories that contain zero or more files and subdirectories. One sub-key called HKEY_CLASSES_ROOT\ Interface contains all the COM IIDs that exist in the entire computer system. Using the Visual C debugger by the Microsoft Corp. of Redmond Wash., the assembly code can be examined for implementing the operating system's modules, some of those modules implementing the sub-key structure used by the present invention. Similar techniques can be used to reverse engineer other operating system sub-key structures.

The interceptor 200 uses the object handle for the dummy object created via the earlier CoCreateInstance( ) call to invoke its QueryInterface( ) function to test the validity of IIDs 114. As specified by Microsoft DCOM documentation, the QueryInterface( ) function is supported by all DCOM objects 104. The interceptor code discards any CLSID 202 and IID 114 pairs that fail the QueryInterface( ) function call. The interceptor 200 saves the CLSID 202 and IID 114 pairs that satisfy the QueryInteface( ) test for subsequent use.

If the DCOM object 104 is automation-enabled, interface discovery can be accomplished utilizing the associated type library. An automation enabled object follows a set of programming rules that are specified by Microsoft. One of capabilities of an automation-enabled object is that it is able to list out the corresponding IIDs 114 for a given CLSID 202. Automation objects implement a Microsoft defined interface called IDispatch. As those skilled in the art would recognized, the IDispatch interface provides a way for the clients and server to exchanged data. However, not every DCOM object 104 is an automation enabled object. Thus the interceptor code is crafted with the complex algorithm described herein so that it can be applied to any DCOM object 104. In other words, the algorithm works for both automation and non-automation DCOM objects 104.

Using the dummy DCOM object, the interceptor code is able to traverse the DCOM server's 100 virtual table, or vtable, step 410 to retrieve addresses of the functions 106 for interception. The vtable is a table of function pointers which point to each function 106. For the DCOM server 100, there are two levels of nested vtables. In the Microsoft model, there is an intermediate table which is referenced by the nested vtables and which stores the relative address of each function 106. Using a typical disassembler, those skilled in the art are able to retrieve the logic of a particular vtable's construction for a particular operating system. Once the function's 106 relative address is found, the interceptor code in the interceptor 200 has gathered the information necessary to perform fine-grained function interception. The interceptor code is able to build a "C" structure containing the in-line assembly code described above to retain all of the necessary information for the returned run-time DCOM function calls for functions 106, step 412. The structure is replicated for each of the DCOM functions 106. When any DCOM function 106 is executed; the interceptor code redirects the DCOM function's 106 relative address in the intermediate table to execute the assembly code in the interceptor 200.

Figure 5:
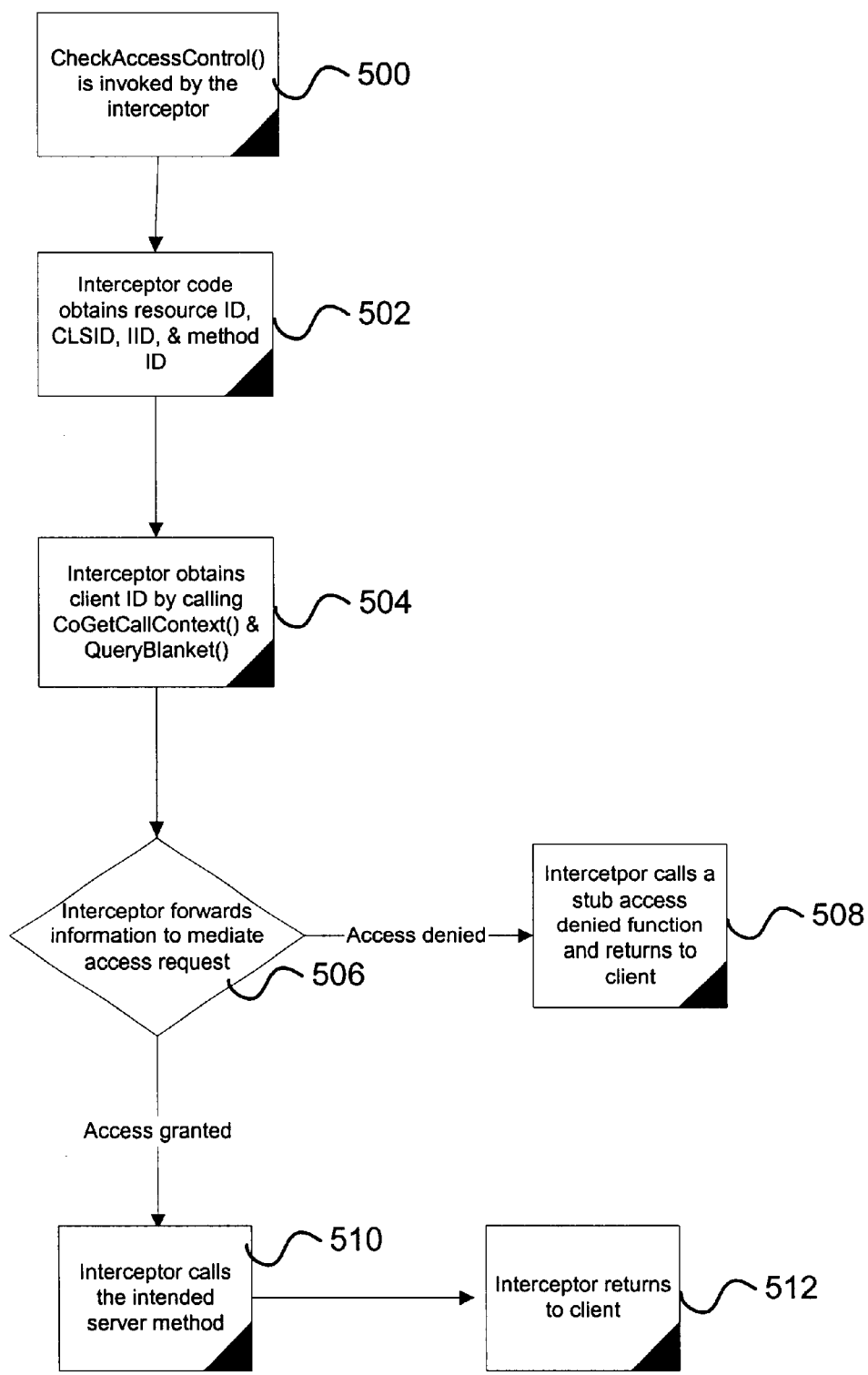
FIG. 5, is a flow diagram illustrating the runtime operation of the interceptor.

With reference to FIG. 5, a flow diagram illustrating the runtime operation of the interceptor 200 and access calculator 250 is shown. During runtime, a function within the interceptor 200 called CheckAccessControl ( ) is invoked, step 500. A pointer to the described C structure has already been pushed onto the stack (by the assembly code) as the first parameter to this function by the interceptor assembly code as described above. All the necessary information about interception is accessible as a result of the initialization steps described with respect to FIG. 4. In particular, CLSID 202, IID 114, and MID 116 for each function 106 are made available for use at runtime, step 502. The combination of these three IDs is known as a DCOM resource identifier. Typically, since the usual operating symbol table information is not available for the non-exported functions 106 to the interceptor, it is not possible to include the ASCII name of each function 106 for mediation purposes.

The only information missing, for mediation purposes, is the client's 150 identity. The interceptor code in interceptor 200 dynamically determines the identity of the caller of the DCOM function 106. Since the DCOM interceptor 200 is running as part of the server, it is effectively running on behalf of the DCOM client 150. Typically, the operating system, such as those made by Microsoft, provides security functions to obtain the identity of the caller, or client 150, of the DCOM function 106.

A security handle is obtained by the interceptor using the standard DCOM function's CoGetCallContext( ) with IID_IServerSecurity as a parameter, and the interceptor uses the security handle to call the standard DCOM function QueryBlanket( ) to get the client's 150 identity, step 504. Under Windows NT 4, the default security service provider (SSP) is the NT Lan Manager, NTLM. The identity of a principal acting on behalf of the client 150 is specified as "domain name\ login id."

Once the principal's identity is obtained, an object and subject pair is available for the access decision. This pair is passed to an external program that makes and returns the access decision to the interceptor, step 506. If the access is denied, the interceptor 200 invokes a stub subroutine and an access denied error code is returned to the client, step 508. If the access is granted, the interceptor passes control to the intended server function 106, step 510. Control is transferred back to the client after the server method has completed execution, step 512.

It will thus be seen that changes may be made in carrying out the above system and method and in the construction set forth without departing from the spirit and scope of the invention, it is intended that any and all matter contained in the above description and shown in the accompanying drawings shall be interpreted as illustrative and not in a limiting sense.

We claim:

1. In a distributed component object model server, a method for intercepting a non-exported function in an application software module, comprising:

intercepting an operating system defined exported function to obtain a runtime class identifier for a class in which the non-exported function is defined;

locating the non-exported function; and constructing interception code for the non-exported function;

wherein the non-exported function at least in part lacks compiler produced information in the application software module.

2. The method of claim 1, wherein the steps of intercepting, locating and constructing comprise initializing the distributed component object model server.

3. The method of claim 2, further comprising initializing a service control manager to control executing of the distributed component object model server.

4. The method of claim 3, wherein the step of initializing the distributed component object model server further comprises attaching the interception code to the distributed component object model server.

5. The method of claim 4, wherein the step of initializing the distributed component object model server further comprises registering the non-exported function with the service control manager.

6. The method of claim 5, wherein the step of registering comprises invoking a kernel function for registering the class with the service control manager such that the non-exported function can be accessed with a method call invoked by the client by means of locating the registration in the service control manager.

7. The method of claim 1, further comprising enforcing an access control policy by selectively granting access to a client of the distributed component object model server to the non-exported function by intercepting execution of the non-exported function by means of the interception code.

8. The method of claim 7, wherein the step of enforcing comprises the interception code invoking an access control subroutine for selectively granting access to the non-exported function.

9. The method of claim 8, wherein the step of enforcing occurs when the client accesses the non-exported function.

10. The method of claim 1, wherein the step of locating comprises the steps of:
identifying an interface identifier for the non-exported function by searching the operating system registry using the class identifier; and
retrieving a memory location for the function by searching a table of pointers to functions in the operating system corresponding to a runtime object for the class identifier and the interface identifier.

11. The method of claim 1, comprising intercepting a plurality of non-exported functions in a plurality of application software modules, comprising the steps of:
intercepting an operating system defined exported function to obtain a plurality of runtime class identifiers for a plurality of classes in which the non-exported functions are defined;
locating the non-exported functions; and
constructing interception code for each non-exported function.

12. The method of claim 11, further comprising enforcing a plurality of access control policies by selectively granting access to a plurality of clients of the distributed component object model server to the plurality of non-exported functions by intercepting execution of the each of the plurality of non-exported functions by means of the interception code for each of the plurality of non-exported functions.

13. A system for intercepting a non-exported function in an application software module on a distributed component object model server comprising:
a distributed component object model server comprising a processor and an addressable memory unit for storing the non-exported function, and a registry for storing an identifier identifying the non-exported function;
an exported function stored in the memory unit, the exported function adopted to retrieve the identifier by scanning the registry;
a table for storing a memory address where the non-exported function is stored in the memory unit, the identifier further for identifying the memory address in the table; and
an interceptor software program for intercepting the exported function and for executing the exported function to retrieve the identifier from the registry, the interceptor software program further for locating the non-exported function in the memory unit by locating the memory address of the non-exported function in the table using the identifier, the interceptor software program further comprising interception code for intercepting the non-exported function;
wherein the non-exported function at least in part lacks compiler produced symbol information in the application software module.

14. The system of claim 13, wherein the interceptor software program is for creating an object for scanning the registry for the identifier, and for locating the memory address in the registry.

15. The system of claim 13, the interceptor software program further comprising an access control subroutine for selectively granting access to the non-exported function to a client of the distributed component object model server.

16. The system of claim 13, wherein the memory unit is for storing a plurality of non-exported functions.

17. The system of claim 16, wherein the registry is for storing an identifier corresponding to each of a related group of non-exported functions.

18. The system of claim 17, wherein the table is for storing memory addresses for the related non-exported functions indexed by corresponding identifiers.

19. The system of claim 18, wherein the exported function is adopted to retrieve the corresponding identifiers for the non-exported functions from the registry.

20. The system of claim 19, wherein the interceptor software program is for executing the exported function to retrieve the identifiers, and for locating the corresponding non-exported functions in the memory unit by locating the corresponding memory addresses for the non-exported functions in the registry by locating the identifiers in the table, the interceptor software program further comprising interception code for intercepting the corresponding non-exported functions.

21. A system for intercepting a non-exported function in an application software module on a distributed component object model server comprising:
a distributed component object model server comprising a processor and an addressable memory unit for storing the non-exported function, and a registry for storing an identifier identifying the non-exported function;
an exported function stored in the memory unit, the exported function adopted to retrieve the identifier by scanning the registry;
a table for storing a memory address where the non-exported function is stored in the memory unit, the identifier further for identifying the memory address in the table; and
an interceptor software program for intercepting the exported function and for executing the exported function to retrieve the identifier from the registry, the interceptor software program further for locating the non-exported function in the memory unit by locating the memory address of the non-exported function in the table using the identifier, the interceptor software program further comprising interception code for intercepting the non-exported function;
wherein the non-exported function at least in part lacks compiler produced symbol information in the application software module;
wherein the interceptor software program further comprises an access control subroutine for selectively granting access to the non-exported function to a client of the distributed component object model server;

wherein the memory unit is for storing a plurality of non-exported functions;

wherein the registry is for storing an identifier corresponding to each of a related group of non-exported functions;

wherein the table is for storing memory addresses for the related non-exported functions indexed by corresponding identifiers;

wherein the exported function is adopted to retrieve the corresponding identifiers for the non-exported functions from the registry;

wherein the interceptor software program is for executing the exported function to retrieve the identifiers, and for locating the corresponding non-exported functions in the memory unit by locating the corresponding memory addresses for the non-exported functions in the registry by locating the identifiers in the table, the interceptor software program further comprising interception code for intercepting the corresponding non-exported functions.

* * * * *

UNITED STATES PATENT AND TRADEMARK OFFICE
CERTIFICATE OF CORRECTION

| | |
|---|---|
| PATENT NO. | : 6,587,888 B1 |
| APPLICATION NO. | : 09/464375 |
| DATED | : July 1, 2003 |
| INVENTOR(S) | : Chieu et al. |

Page 1 of 1

It is certified that error appears in the above-identified patent and that said Letters Patent is hereby corrected as shown below:

Col. 8, line 55, insert --symbol-- before "information" and after "produced".

Signed and Sealed this

Twenty-third Day of November, 2010

David J. Kappos
*Director of the United States Patent and Trademark Office*